June 28, 1966   C. LAKE   3,258,385
DEVICE FOR SEALING THERMOPLASTIC FILM
Filed Nov. 7, 1961   2 Sheets-Sheet 1
FIG. 1
FIG. 2
FIG. 3
FIG. 4
FIG. 5
FIG. 6
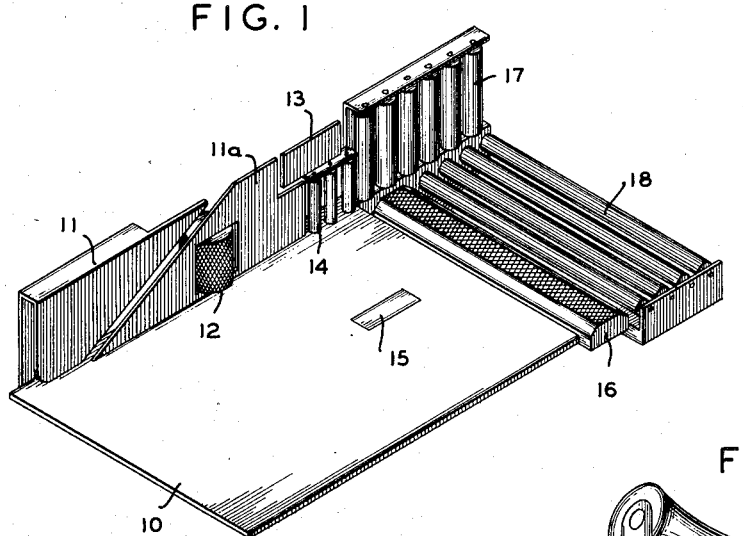
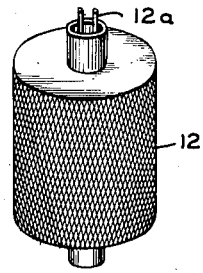
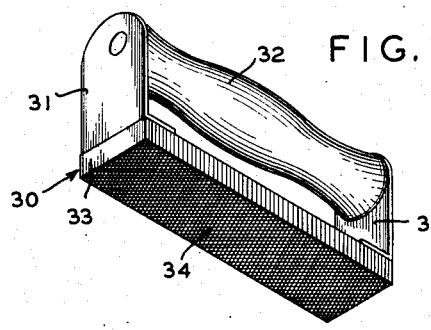
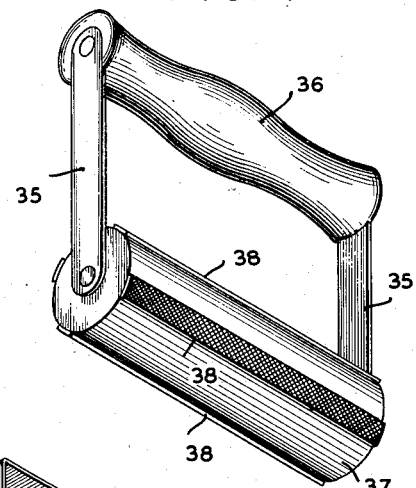
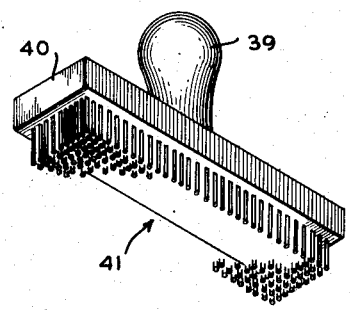
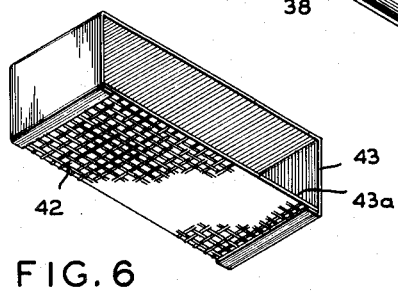
INVENTOR
CONNIE LAKE
BY E. Janet Berry
ATTORNEY INVENTOR
CONNIE LAKE
BY E. Janet Berry
ATTORNEY United States Patent Office 3,258,385
Patented June 28, 1966

3,258,385
DEVICE FOR SEALING THERMOPLASTIC FILM
Connie Lake, Pittsford, N.Y., assignor to National Distillers and Chemical Corporation, New York, N.Y., a corporation of Virginia
Filed Nov. 7, 1961, Ser. No. 150,803
3 Claims. (Cl. 156—581)

This invention relates generally to the sealing of thermoplastic films and to novel sealing devices therefor whereby effective seals, preferably having peelable characteristics or otherwise, may be produced through two or more layers of such films.

The invention is particularly directed to the sealing of thermoplastic films including polyolefins, specifically oriented films, as well as oriented and non-oriented polystyrenes, polyesters (e.g. Mylar), polyvinyl chlorides (e.g. Reynolon), and is concerned especially with the sealing of biaxially oriented polypropylene films wherein unusual and unexpected problems are presented inherently.

It is known in prior art practices to produce satisfactory seals in thermoplastic films through the application of heat under carefully controlled conditions, with and without the application of pressure. In this manner, seals of permanent characteristics may be produced in such films as polyethylene without particular difficulty, although shrinking and distortion may result. Suitable precautions must be exercised, as to temperature, pressure and dwell time, and, in addition, it is necessary that the film be protected from direct contact with the heating element or sealer through utilization of a suitable cover such as "Teflon" impregnated glass cloth or the like. However, peelable seals, whereby the package may be opened without destruction of the sealed film, cannot be produced in any way even by this method and it is presently unknown in the art to produce in a commercially acceptable manner "peelable" heat seals on an oriented polyolefin film. In the production of seals under present practices, and this is especially true with oriented films, actual melting and fusion takes place at the point of seal, and ready rupture occurs in any attempt to separate the sealed surfaces.

With respect to biaxially oriented polypropylene films, one layer thereof cannot be sealed to another except where the sealer is externally covered and even under such conditions normal sealing practices are ineffective since application of heat results in random disorientation of the molecules, causing excessive shrinking and tearing of film. Efforts to overcome these problems through the use of a coating applied to the film or heat moderating coverings on the sealing surface, have met with only partial success.

It is a major purpose of the invention to provide a novel method for producing effective seals, having peelable or substantially permanent characteristics, in thermoplastic films including particularly oriented polypropylene without any necessity for the utilization of covering materials to prevent contact of the sealing element wtih the film per se or applying a coating of any kind to the film itself.

It is a further object of the invention to provide novel seals in thermoplastic films, such seals having peelable or permanent characteristics as desired.

It is a still further object of the invention to provide novel sealing devices for the sealing of thermoplastic films, including particularly the oriented polypropylene, whereby effective seals may be produced, having peelable or permanent characteristics, without requiring the use of either a protective cover between the sealing device and the film or the coating of the film.

It is still a further object of the present invention to provide a novel sealing method whereby packages may be effectively sealed in thermoplastic molecularly oriented film wrappers without the necessity for any application of positive pressure upon the film surfaces being sealed, the weight of the package or guiding pressures exerted during a continuous or semi-continuous process as the article is advanced through automatic sealing apparatus being sufficient to provide surface contact between layers of film and insuring the effective sealing thereof, whereby peelable seals are produced.

It is a further object of the invention to provide novel packages sealed in thermoplastic film wrappers, at least one of the sealed surfaces of such packages having peelable characteristics providing ready and repeated access to package contents without substantial destruction of the film at the point of seal. In the absence of a sealed surface having peelable characteristics, that is, where a package is sealed in a thermoplastic film wrapper and all of the sealed surfaces are of welded characteristics, opening a welded seal will destroy the packaging film, thereby permanently exposing the package contents and effectively preventing secure reclosure of the package in the original film wrapper.

It is a still further object of the invention to effect a seal across a limited area of thermoplastic film, and including more specifically, oriented polypropylene, said area consisting of two layers of film and a single layer thereof without injury to the single layers, including excessive shrinkage, burning through, or the like.

Further objects and advantages of the invention will be readily apparent from the following description taken in connection with the accompanying drawings wherein:

FIGURE 1 is a fragmentary perspective view illustrating somewhat diagrammatically wrapping and sealing apparatus including sealing devices embodying the present invention;

FIGURE 2 is a perspective view of the vertical sealing element;

FIGURE 3 is a perspective view of a hand sealer having a multipoint sealing surface constructed in accordance with the present invention;

FIGURE 4 is a perspective view of a roller type hand sealer, the roller being provided with spaced and longitudinally extending multipoint sealing surfaces;

FIGURE 5 is a perspective view of a wire brush type hand sealer suitable for multipoint sealing;

FIGURE 6 is a perspective view of a wire screen type hand sealer suitable for multipoint sealing;

Figure 7:
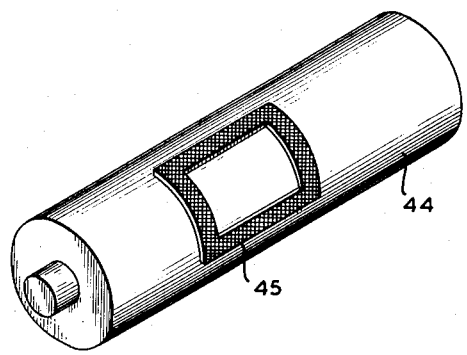
FIGURE 7 is a perspective view of a roller including a multipoint sealing surface of hollow rectangular conformation.

Prior art practices have long undertaken the sealing of thermoplastic films through application of heat and pressure, sealing being accomplished more or less continuously over the entire area where two or more layers of film were to be united. Various sealing devices, both manual and automatic, have been used for such purposes and these have included heated sealing surfaces of substantial extent which were applied to the film areas to be united. More particularly, the sealing of uncoated biaxially oriented propylene film to obtain a good "peelable" seal without resorting to special coatings or adhesives has been recognized as a problem in the packaging industry. Attempts to heat seal biaxially oriented film usually result in excessive shrinkage and tearing of the film.

Applicant has now discovered that continuous or extensive sealing surfaces are not required for such purposes. On the contrary, sealing elements which provide a plurality of closely spaced and relatively small sealing surfaces may be employed to produce highly efficient seals which may or may not have peelable characteristics, this multipoint sealing concept and end result being entirely novel. It is contemplated that the method of sealing described herein, the seals produced thereby, the packages produced by use of one or more of such seals, and certain of the sealing devices are all novel and inventive.

Several illustrative sealers and sealing surfaces have been shown in the drawings, suitable for both manual and automatic operation.

One field of particular commercial importance may be found in the wrapping of articles and merchandise such as loaves of bread, sliced or otherwise, where specifically, a longitudinal or bottom seal, as well as end seals, are required and for a commercially acceptable package it is of prime importance that the end seals be readily peelable so that repeated access may be had to the package contents for the removal of a portion thereof with the wrapper remaining substantially intact so that it may be closed after each opening and the contents protected against undue drying out and other unwanted effects caused by exposure to air.

As a specific embodiment, a wrapping machine for such purposes has been illustrated in FIGURE 1 of the drawings and includes a guideway 10 through which loaves of bread, not shown, which have been wrapped in thermoplastic sheet material are advanced continuously to the sealing stage.

Such apparatus is well known, requiring no particular discussion here, and includes folding mechanism 11 and 11a which complete the envelopment of the loaf of bread within the wrapper, it being understood that the longitudinal edges of the wrapper overlie each other beneath the loaf of bread.

As the wrapping of each loaf of bread is thus completed, the package is advanced between vertically disposed end sealers 12 each of which is mounted for rotative movement and includes a multipoint sealing surface of specific configuration which will be discussed more fully hereafter. The sealing surfaces of the vertically disposed end sealers are heated to an appropriate sealing temperature, dependent upon the thermoplastic material employed and as is well known in this art, and no particular extra pressure other than that of the package itself, or dwell time, is required to perform the end sealing operation, it being sufficient that the end sealers, which are mechanically driven, have contact and frictional engagement with the wrapped ends of the loaves of bread as these pass through the guideway.

The wrapped loaves of bread, peelable end seals having been accomplished as discussed hereinabove, are advanced to the label applying station 13, vertically disposed rollers or the like 14 assisting in the application of end labels, pass over the loaf ejector 15, and then reach the bottom sealing element 16 which desirably also is provided with a multipoint heated sealing surface comparable to that of the end sealers 12, a preferred embodiment of these surfaces being illustrated in FIGURES 9 and 10 of the drawings. Desirably the bottom sealing element is in the form of a convex plate, as distinguished from the cylindrical end sealing members, to conform to the somewhat hollow or concave bottom of the bread loaf, and the usual push-on stop-push-off technique of sealing is employed with provision for regulation of dwell time in accordance with the nature of the film employed and the temperature of the bottom sealing bar. Moving from this final sealing station, the loaf engages with vertically and horizontally disposed heated rollers indicated at 17 and 18, respectively. The heated vertical rollers 17 melt the adhesive on the end labels, securing these to the loaf ends; the heated horizontal rollers function to melt the wax on an inner band label, causing it to adhere to the film on the bottom of the package.

Bottom sealing also may be accomplished by a rotary sealer, similar to the end sealers 12. Further, utilizing oriented polypropylene sheet wrapping material, with continuous motion of the rotary bottom sealer, no dwell time is required in accomplishment of the bottom seal.

With multipoint sealing as taught herein, as distinguished from a seal accomplished over the entire area contacted by the sealing element, the layers of the film are sealed or joined at a multitude of closely spaced points. These points may be provided by designing the sealing surface of the sealing element, as by knurling, serrating or the like, to provide more or less uniformly spaced points over a given portion of the surface thereof, and it is these points which ultimately transmit the necessary heat and pressure to the material to be sealed. While the dimension and shape of these points may vary, desirably each point should have a flat top to provide a sealed surface having some lateral extent, since a sharply pointed extremity tends to create an aperture at the point of contact.

Figure 9:
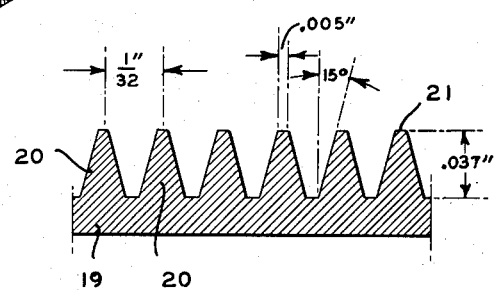
FIGURES 9 and 10 are magnified fragmentary views illustrating a specific multipoint sealing surface of truncated rectangular pyramidal configuration.
Figure 10:
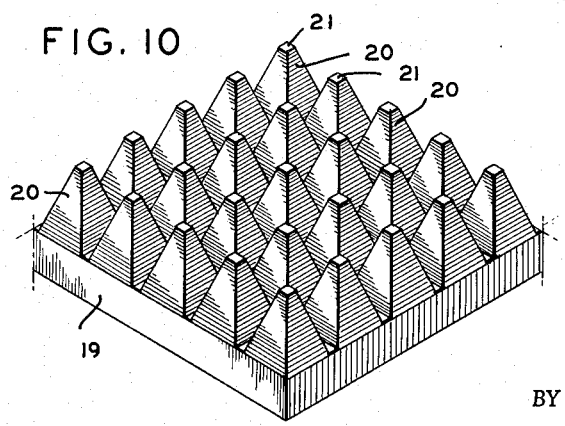

As illustrated in FIGURES 9 and 10 of the drawings, the sealing element 19, which may be part of a flat bar, a cylinder, or other element, is provided with a plurality of closely spaced rectangular pyramids 20 truncated as indicated at 21 to provide a flat sealing surface. While dimensions are not viewed as of extreme criticality, excellent results have been obtained where the pyramids were spaced apart approximately one thirty-second of an inch (1/32") from point to point and the sides sloped at an angle of 15° from the vertical. This is the general order of magnitude pyramid size which has been found desirable.

Rectangular pyramids of this character, spaced as stated and truncated to provide a flat top measuring about .005" square, will have a depth of about .037". It will be understood that within practical limits, differing pyramidal and conical forms may be utilized with equally satisfactory results.

Varying the spacing of the sealing projections, and varying the size of the flat tips thereof, will have a direct bearing on the actual area which is sealed. The multipoint sealing contemplated is produced through what may be termed as micro-spotwelding technique in which up to 2½% of the surface is actually sealed. However, highly efficient seals have been produced, all readily peelable, where from ½% to 10% of the surface was sealed. These figures are to be viewed as purely illustrative and in no manner limiting to the scope of the invention.

Any material which will function as a heat conductor, and can be fabricated to produce sealing projections, may be employed. These can be metallic and may include, among others, stainless steel, brass, aluminum, and clad materials.

As indicated hereinabove, sealing temperatures will vary in accordance with the thermoplastic material employed, lower temperatures being required for polyethylene than for polypropylene. Minimum temperatures will range from 200° F. for polyethylene and 235° F. for polypropylene to up to 1500° F. Below 200° F. sealing cannot be accomplished even with infinite residence time. Where temperatures exceeding 1500° F. have been attempted, burn-through occurred immediately upon contact.

A practical range as to residence time has been found to be from 0.1 to 8 to 10 seconds; thus, residence time or dwell interval are inversely related to temperature for any particular film.

Continuous webs of thermoplastic material may have the overlapping edges thereof sealed with devices constructed in accordance with the present invention. Efficient seals, which are peelable, are obtainable without material film distortion or shrinkage. Package sealing speeds up to 1000 feet per minute are entirely feasible.

Further, multipoint sealing may be accomplished through a multiplicity of layers of film, this being variable in accordance with the type of film, residence time, and temperatures employed. As a single example, with oriented polypropylene film having a gauge of .6–.7 mil, 8 to 10 layers may be sealed at a speed of 20 feet per minute on a roll, the sealing temperature employed being within the range of 450 to 600° F. Moreover, with multipoint sealing as taught herein, no positive pressure is required, frictional contact, guiding pressure or weight of the product per se with a wrapped package passing over a sealing element, being all that is required.

Multipoint sealing surfaces may be incorporated in so-called hand sealers with particular facility. In FIGURE 3 of the drawings, the sealer 30 includes side portions 31, a handle 32, and a flat base 33 including a multipoint sealing surface 34.

The hand sealer illustrated in FIGURE 4 of the drawings includes side portions 35, a handle 36 mounted therebetween and a sealing roller 37 which is provided with spaced multipoint sealing surfaces 38.

Other surfaces, rather than of spaced point (pyramidal or otherwise) configuration, may be utilized. In FIGURE 5 a hand sealer is illustrated which includes a handle portion 39, a base portion 40 and wire-brush structure 41. It will be understood that each "bristle" of the "wire-brush" will constitute a sealing "point."

As illustrated in FIGURE 6, a wire screen 42 supported within an appropriate frame 43 may be employed, a suitable backing element 43a being provided, each overlapping of longitudinal and transverse wire constituting a sealing "point."

Figure 8:
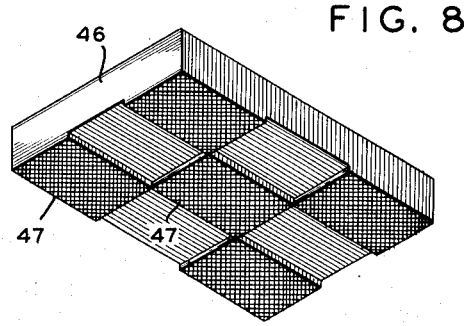
FIGURE 8 is a perspective view of a flat sealing surface including multipoint sealing areas disposed in checker board formation.

It also is within the scope of the invention to provide novel sealing elements which will provide multipoint seals of specific configuration including spaced sealed portions. Thus, in FIGURE 7, the sealing roller 44 illustrated includes a multipoint sealing area 45 of hollow rectangular configuration. This could be employed with particular advantage on a wrapped item having a surface of complementary configuration and slightly greater area. So, too, with the sealer 46 of FIGURE 8 which includes rectangular multipoint sealing areas 47 disposed in "checker board" arrangement.

An important advantage of the sealers disclosed herein, and contemplated under applicant's inventive teachings, is that actual sealing time may not be held to be critical. This is in diametric opposition to established practices with conventional sealers where sealing time is a most critical variable.

Suitable means is provided for heating the sealing members and a preferred method is the utilization of a controlled electrical heating element which is inserted into the sealer or is in intimate contact therewith. One embodiment thereof has been illustrated somewhat diagrammatically in FIGURE 2 of the drawings. Other methods may be employed as, for example, heating the sealing surface with radiant energy from a quartz lamp.

As an additional improvement, it has been found that this sealing process has the ability to increase the tear strength and stiffness of oriented film especially when employed with oriented polypropylene film. One of the disadvantages of molecularly oriented polyolefin films is that they possess relatively low tear strengths. That is to say, it is relatively difficult to start a tear but once started, very little force is needed to continue the tear. The herein described multipoint sealing process creates numerous minute spots on the film which have been melted or fused to such a degree that once encountered, they will cause a tear to stop and in order to continue, the tear must be started again. Since it is always relatively difficult to initiate a tear (as compared to continuing a tear already started) this "stopping and starting" of a tear results in the necessity for an overall greater force in order to tear completely through a sheet of film. Thus, there has been accomplished an overall greater tear strength. Tear strength is very important in many packaging applications because of the very great likelihood of initiating a tear on opening a package which would then, if the wrapping material has low tear strength, "run" around the package and release the entire package contents.

This process, which results in a multipoint of melted spots creates a stiffening effect of the film. This effect is caused by the fact that the melting process creates minute raised portions or rib-like distortions of the film in the area around the fused spot which actually act as a multitude of stiffeners to the film and which resist bending in each of their immediate areas. This increased stiffness is hightly desirable in packaging applications where the packaging machine depends on the stiffness of the film for feeding into the machine. A typical example of this would be an application where the film is pushed into position instead of being pulled.

An examination of film surfaces which have been sealed in accordance with the present invention fails to disclose any perceptible shrinkage at the sealed areas. This phenomenon is believed to result from the fact that only a fraction of the film comes into actual contact with the heated multipoint surface while the major portion of the film, which has not contacted any sealing surface, remains intact.

The foregoing constitutes a description and sets forth a number of embodiments of the invention, although nothing therein is intended to limit the invention, except in accord with the claims appended hereto.

What is claimed is:

1. A thermosealing device for producing a peelable seal through at least two layers of superposed thermoplastic sheet material without the application of pressure and without distortion or shrinkage of said sheet material, said device including a discontinuous sealing surface constituted by a plurality of closely and uniformly spaced sealing projections, each of said projections including a substantially flat sealing surface of sharply reduced area whereby a plurality of discontinuous and peelable fused areas are formed in said sheet material, each of said fused areas being spaced from adjacent fused areas by an expanse of unsealed sheet material of substantially greater extent than the width of one of said fused areas, each of said projections being of substantially greater height than width and including an enlarged base portion and upwardly inclined side portions, the base portion of each projection being spaced apart from the base portions of the adjacent projections a distance substantially greater than the width of each of said substantially flat sealing surfaces, and means for heating said projections.

2. A thermosealing device as set forth in claim 1 where each of said projections is a truncated pyramid where each substantially flat sealing surface is approximately .005 inch square.

3. A thermosealing device as set forth in claim 2 where the spacing of said pyramids is approximately $\frac{1}{32}$ inch, where each truncated surface is approximately .005 inch square, where each pyramid side slopes at an angle on the order of 15 degrees from the vertical, and where the height of each pyramid is approximately .037 inch.

(References on following page)

References Cited by the Examiner

UNITED STATES PATENTS

| | | | |
|---|---|---|---|
| 1,061,039 | 5/1913 | Borchert | 156—583 |
| 2,464,301 | 3/1949 | Francis | 156—582 XR |
| 2,566,799 | 9/1951 | Humphrey | 156—582 |
| 2,621,139 | 12/1952 | Messing | 156—290 XR |
| 2,899,349 | 8/1959 | Jenkins | 156—290 |
| 3,066,848 | 12/1962 | Billeb | 99—172 |

OTHER REFERENCES

Polypropylene by Kesser published by the Reinhold Publishing Corp., Library of Congress catalog card No. 60–53435, copyright 1960 pp. 57 to 60 and 163 to 191 inclusive.

EARL M. BERGERT, *Primary Examiner.*

M. L. KATZ, R. I. SMITH, *Assistant Examiners.*